(No Model.) 2 Sheets—Sheet 1.

C. R. SHOREY.
BICYCLE.

No. 471,292. Patented Mar. 22, 1892.

Witnesses
Inventor
Charles R. Shorey
By his Attorneys
A. H. Evans & Co.

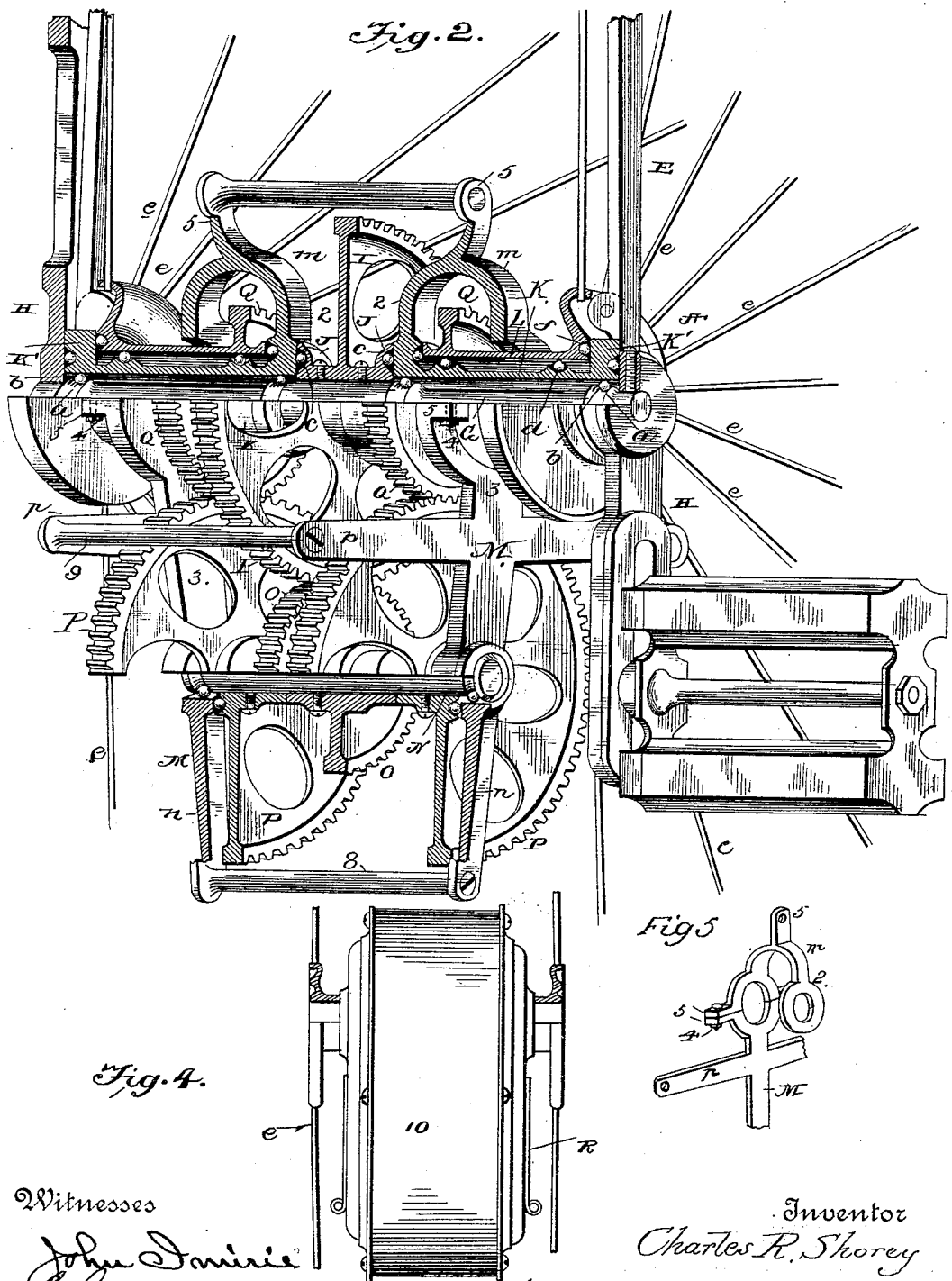

UNITED STATES PATENT OFFICE.

CHARLES R. SHOREY, OF FARGO, NORTH DAKOTA.

BICYCLE.

SPECIFICATION forming part of Letters Patent No. 471,292, dated March 22, 1892.

Application filed August 26, 1891. Serial No. 403,809. (No model.)

*To all whom it may concern:*

Be it known that I, CHARLES R. SHOREY, a citizen of the United States, residing at Fargo, in the county of Cass and State of North Dakota, have invented certain new and useful Improvements in Bicycles, as set forth in the accompanying drawings, forming part of the specification, in which—

Figure 1:
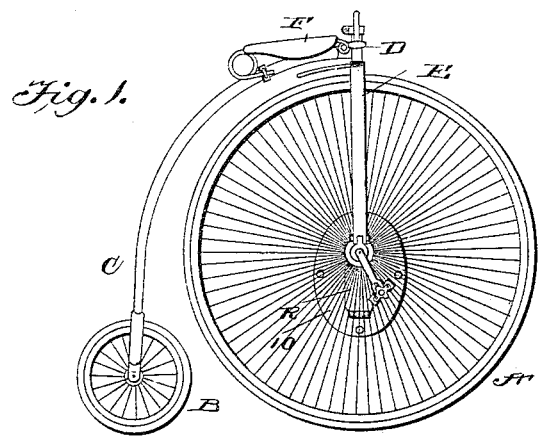
Figure 3:
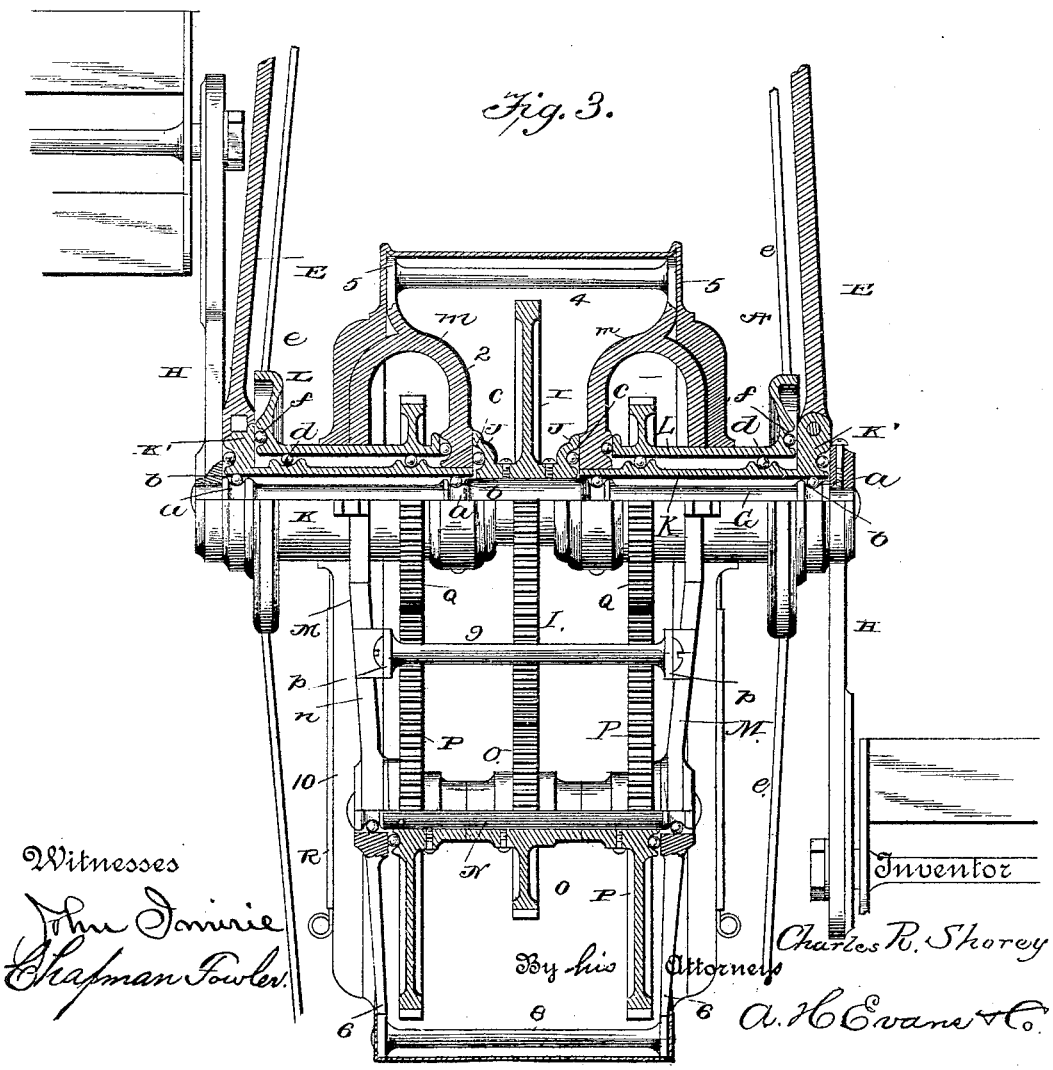

Figure 1 represents a side elevation of a bicycle embodying my invention. Fig. 2 is a perspective view, partially in section, of the driving mechanism, showing the casing or housing removed. Fig. 3 is a front view of the same. Fig. 4 is a side view of the casing or housing. Fig. 5 is a detail.

My invention relates to bicycles generally; and it consists of the constructions and combinations of devices which I shall hereinafter fully describe and claim, the main object of the invention being to obtain increased speed without a corresponding increase of motion to the rider.

To enable others skilled in the art to which my invention appertains to make and use the same, I will now describe its construction and indicate the manner in which the same is carried out.

In the accompanying drawings I have shown my invention applied to what is known as the "upright machine," wherein A indicates the large wheel, B the smaller wheel, C the backbone, D the handles, E the forks, and F the saddle, all of which may be of the usual or of any well-known construction and form, no part of the present invention.

The main shaft G has secured to its outer ends the pedal-levers H, to which any suitable form of pedals may be attached, and said axle is formed with annular grooves $a$ near its ends and center to receive balls $b$, as indicated in Figs. 2 and 3. At the center of the shaft G is secured a large gear-wheel I, having a hub whose ends are formed with vertical flanges J, whose outer faces are provided with annular grooves $c$, adapted to receive balls to furnish a ball-bearing between the flanges and contiguous parts.

Exterior of the main shaft and confined between the flanges on the hub of the gear I and the upper ends of the pedal-levers are the cylindrical sleeves or thimbles K, whose outer ends are formed with collars K', to which the lower ends of the forks are secured, so as to connect the forks with the thimbles or sleeves, said sleeves or thimbles having their outer surfaces grooved transversely at two or more points to receive balls $d$, upon which rest and turn the wheel-hubs L. These hubs have smooth inner peripheries and flanged ends, the flanges at the outer ends abutting against the contiguous faces of the collars K' and having the spokes $e$ fitted to them in the usual manner, and the outer faces of the flanges being formed with annular grooves $f$, adapted to receive balls which operate against the faces of the collars K', as shown in Fig. 2 and 3.

Suspended from the main shaft is a frame M, preferably formed of two upper and two lower sections, the upper sections $m$ being each of arched form, having an inner arm 2, secured directly to inner end of the thimble or sleeve between the adjoining faces of the hubs L and hub-flanges of the gear I, while the lower portion of the outer arm is turned at right angles to the main shaft and made with a semicircular opening, which, with a similar opening in the upper end of the arms 3 of the lower section $n$, forms an opening for the passage of the hubs L, these sections $m$ and $n$ of the frame M being bolted together at their junction. The upper ends of the sections $m$ are joined together by a bolt or rod passing through lugs or short arms 5, extending from the arched portions. The lower ends of the vertical side arms of the lower section $n$ are also joined together by a bolt or rod 8, while at points above these lower ends the side arms are provided with bearing for a transverse shaft N, to the center of which is keyed or otherwise fitted a small gear or pinion O, adapted to mesh with the gear-wheel I on the main shaft. At the opposite ends of the shaft N are secured gear-wheels P, whose diameters approximate that of the gear I on the main shaft, and said gears P are adapted to mesh with pinions or smaller gears Q on the inner ends of the hubs L between the arched upper portions of the side arms of the frame M. From this arrangement of gearing it will be seen that as the main shaft is rotated its power is communicated through the large gear I to the pinion or smaller gear O, and is thence transmitted through the shaft N and the large gears P to the smaller gears or pinions on the hubs of the large wheel. I am therefore enabled to obtain an increased speed for the large wheel, but without any increased movement of the pedals. Therefore the rider is permitted to increase his speed without danger of his missing the pedals because of any material increase in the movement of the pedal-levers, and this increased speed is proportionate to the relative sizes of the gears.

It will be observed that all of the grooves heretofore mentioned as part of the ball-bearings have each a concaved portion or lower wall and two convex surfaces or side walls joining the lower wall, but flaring outwardly therefrom, so that the entrance to the groove is of greater capacity than the bottom of the same. The balls when placed within these grooves occupy as much of the groove as will cover about one-third of the surface of the balls, the only other points of contact being the opposite sides of the balls, where the contiguous pieces or devices rest upon them. Such an arrangement gives great freedom to the balls and greatly reduces the friction between them and the contacting-surfaces, and is found to be superior to those bearings where the balls are seated in V-shaped grooves and are liable to stick or become wedged at times when an increased weight or force is applied to the bicycle. Therefore by making the grooves with concaved bases and then forming the side walls by reversed arcs of about the same radius the balls are free to rotate without the friction common to balls seated in V-shaped grooves, where the grooves impinge upon the sides of the balls near the center and necessitate their revolving much faster than when seated in grooves formed with the concaved seats and convex sides, as herein described and shown.

The frame M, before mentioned as consisting of upper and lower sections bolted together and forming a housing for the gearing, has its lower sections $n$ provided with front and rear extending arms $p$, joined together by bolts or rods 9, and to these arms $p$ and the arms 5 and 3 of the upper and lower sections a casing 10 is bolted, (by the bolts uniting the arms,) thereby strengthening the frame and forming an inclosed housing for the frame M and its gearing to prevent ingress of dust and other foreign matter. This casing 10 has openings for the passage of the hubs of the large wheel A, and is provided in its sides with slides R, whereby access may be had to the internal gearing when necessary.

Having thus described my invention, what I claim as new, and desire to secure by Letters Patent, is—

1. In a bicycle, the main shaft having annular grooves near its center and ends and the pedal levers, in combination with a stationary thimble or sleeve surrounding the shaft, balls in the grooves of the shaft and supporting the thimble or sleeve, a driving-wheel having its hub mounted upon the thimble, and means for transmitting the motion of the main shaft to the wheel-hubs.

2. In a bicycle, a main drive-shaft having annular grooves near its center and ends, a stationary sleeve surrounding the shaft, having its inner surface resting upon balls in said grooves, and gearing between the drive-shaft and wheel-hubs for rotating the wheel, substantially as herein described.

3. In a bicycle, a main drive-shaft having annular grooves near its center and ends, balls fitted in said grooves, a stationary sleeve interposed between the wheel-hubs and the driving-shaft and resting upon said balls, a large gear on the drive-shaft, a second shaft having a smaller gear driven by the larger one, other large gears on said second shaft, and smaller gears on the wheel-hubs, whereby the speed of the drive-shaft is multiplied and transmitted directly to the wheel-hubs, substantially as herein described.

4. In a bicycle, the drive-shaft having annular grooves near its ends and center, balls adapted to be placed therein, a sleeve or thimble having its inner periphery adapted to rest upon said balls and having annular grooves on its outer periphery, the drive-wheel having hubs mounted upon balls in the grooves of the thimble or sleeve, and gearing between the drive-shaft and hubs, substantially as herein described.

5. In a bicycle, the combination of the main drive-shaft having annular grooves near its ends and center, the gear on said shaft having hub-flanges provided with annular grooves in the outer faces, the wheel-hubs having annular grooves in its outer periphery, balls fitted in all of said grooves and adapted to fit against contiguous bearing-surfaces, a second shaft carrying a small gear at its center and larger gears near its ends, other small gears on the wheel-hubs engaged by these latter gears, and a frame M, formed of upper and lower sections bolted together, said upper sections having arms fitted to the inner ends of the thimble or sleeve, while the lower sections support said second shaft, substantially as herein described.

6. In a bicycle, the drive-shaft, the drive-wheel, and gearing between the wheel-hubs and shaft, in combination with a casing inclosing the gearing and having slide-controlled openings in its sides, substantially as herein described.

CHARLES R. SHOREY.

Witnesses:
J. B. CRUCIAL,
M. M. RAMER.